(12) United States Patent
Armstrong et al.

(10) Patent No.: US 8,571,408 B2
(45) Date of Patent: Oct. 29, 2013

(54) HARDWARE ACCELERATED DATA FRAME FORWARDING (75) Inventors: William J. Armstrong, Rochester, MN (US); Claude Basso, Raleigh, NC (US); Josep Cors, Rochester, MN (US); Daniel G. Eisenhauer, Austin, TX (US); Carlos F. Fuente, Hampshire (GB); Kyle A. Lucke, Oronoco, MN (US); Theodore B. Vojnovich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 12/765,109

(22) Filed: Apr. 22, 2010

(65) Prior Publication Data
US 2011/0262134 A1 Oct. 27, 2011

(51) Int. Cl.
*H04J 14/00* (2006.01)
(52) U.S. Cl.
USPC .......................................................... 398/45
(58) Field of Classification Search
USPC ..................... 370/389; 709/230, 217; 398/45
See application file for complete search history.

(56) References Cited

U.S. PATENT DOCUMENTS

| | | | |
|---|---|---|---|
| 6,802,068 B1 | 10/2004 | Guruprasad | |
| 7,751,416 B2 | 7/2010 | Smith et al. | |
| 7,756,027 B1 | 7/2010 | Reddy et al. | |
| 7,992,149 B2 | 8/2011 | Carollo et al. | |
| 8,194,534 B2 | 6/2012 | Pandey et al. | |
| 2003/0037163 A1 | 2/2003 | Kitada et al. | |
| 2004/0037279 A1 | 2/2004 | Zelig et al. | |
| 2006/0023708 A1* | 2/2006 | Snively et al. | 370/389 |
| 2006/0248158 A1 | 11/2006 | Ha et al. | |
| 2007/0067432 A1 | 3/2007 | Tarui et al. | |
| 2008/0056300 A1 | 3/2008 | Williams | |
| 2008/0159260 A1 | 7/2008 | Vobbilisetty et al. | |
| 2008/0275975 A1 | 11/2008 | Pandey et al. | |
| 2009/0161692 A1 | 6/2009 | Hirata et al. | |
| 2009/0252181 A1 | 10/2009 | Desanti | |
| 2009/0254677 A1 | 10/2009 | Desanti | |
| 2009/0265501 A1 | 10/2009 | Uehara et al. | |
| 2009/0276526 A1 | 11/2009 | Carlson et al. | |
| 2010/0067374 A1 | 3/2010 | Elangovan et al. | |
| 2010/0085966 A1* | 4/2010 | Samuels et al. | 370/389 |

(Continued)

FOREIGN PATENT DOCUMENTS

| | | | |
|---|---|---|---|
| WO | WO 2006 093929 | | 9/2006 |
| WO | WO 2009 085536 | | 7/2009 |
| WO | WO 2009/085536 | * | 9/2009 |

OTHER PUBLICATIONS

John L. Hufferd, Proxy Based Shortcut, Oct. 7, 2009, hefferd Enterprises.*

(Continued)

*Primary Examiner* — Dang Ton
*Assistant Examiner* — Mewale Ambaye
(74) *Attorney, Agent, or Firm* — Toler Law Group (57) ABSTRACT

Systems and methods to forward data frames are described. A particular method may include evaluating header data of a data frame at a bridge element, where the header data includes address data that corresponds to a Fiber Channel Forwarder in communication with the bridge element. Based upon the evaluation, the header data of the data frame may be modified at the bridge element in such a manner that the data frame is not routed through the Fiber Channel Forwarder.

25 Claims, 6 Drawing Sheets

(56) References Cited

U.S. PATENT DOCUMENTS

| | | |
|---|---|---|
| 2010/0128605 A1 | 5/2010 | Chavan et al. |
| 2010/0150174 A1* | 6/2010 | Bhide et al. .................. 370/474 |
| 2010/0257269 A1 | 10/2010 | Clark |
| 2011/0061094 A1 | 3/2011 | Salkewicz |
| 2011/0069710 A1 | 3/2011 | Naven et al. |
| 2011/0085557 A1 | 4/2011 | Gnanasekaran et al. |
| 2011/0153715 A1 | 6/2011 | Oshins et al. |
| 2011/0243134 A1 | 10/2011 | Armstrong et al. |
| 2011/0243146 A1 | 10/2011 | Armstrong et al. |
| 2011/0258340 A1 | 10/2011 | Armstrong et al. |
| 2011/0258641 A1 | 10/2011 | Armstrong et al. |
| 2011/0261687 A1 | 10/2011 | Armstrong et al. |
| 2011/0261815 A1 | 10/2011 | Armstrong et al. |
| 2011/0261826 A1 | 10/2011 | Armstrong et al. |
| 2011/0261827 A1 | 10/2011 | Armstrong et al. |
| 2011/0262134 A1 | 10/2011 | Armstrong et al. |
| 2011/0320671 A1 | 12/2011 | Armstrong et al. |

OTHER PUBLICATIONS

CISCO Systems, "The Adaptive Architecture for the Data Center Network", 2007, (3 pgs).

CISCO Systems, "Integrating the Cisco Catalyst Blade Switch 3130 for Dell PowerEdge M1000e Blade Enclosure into the Cisco Data Center Network Architecture—Design Guide," Oct. 2007, retrieved from the Internet: http://cisco.com/en/US/prod/collateral/switches/ps6746/ps8742/ps8764/white_paper_c07-443792.pdf [retrieved on Sep. 21, 2011], (29 pgs).

IBM Patent Application entitled "Forwarding Data Frames With a Distributed Fiber Channel Forwarder," filed by William J. Armstrong on Apr. 22, 2010.

\* cited by examiner

HARDWARE ACCELERATED DATA FRAME FORWARDING

I. FIELD OF THE DISCLOSURE

The present disclosure relates generally to data communications, and more specifically, to data frame forwarding between blade server computers.

II. BACKGROUND

Server computers may compete for access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches.

For example, data frames formatted according to the Fiber Channel over Ethernet (FCoE) standard use a Fiber Channel Forwarder to participate in protocol and data exchange between initiator Information Technology Enclosures (ITEs) and target ITEs. The Fiber Channel Forwarder conventionally executes the Fiber Channel Initialization Protocol and the initiator ITE to target ITE Fiber Channel Protocol connections. The Fiber Channel Initialization Protocol may include processes to discover and initialize FCoE capable entities connected to an Ethernet cloud. The Fiber Channel Protocol is a transport protocol that is configured to transport Small Computer System Interface (SCSI) commands over Fiber Channel networks. SCSI is a set of standards for physically connecting and transferring data between computers and peripheral devices. The reliance on the Fiber Channel Forwarder may cause a processing bottleneck in large scale, or highly-integrated, FCoE networks, such as in Storage Area Networks (SANs).

III. SUMMARY OF THE DISCLOSURE

In a particular embodiment, a method for forwarding data frames is disclosed. The method includes evaluating header data of a data frame at a bridge element. The header data includes address data that corresponds to a Fiber Channel Forwarder in communication with the bridge element. Based upon the evaluation, the header data of the data frame at the bridge element may be modified.

In another embodiment, an apparatus is disclosed that includes a Fiber Channel Forwarder configured to encapsulate and de-encapsulate data frame data and a bridge element in communication with the Fiber Channel Forwarder. The bridge element is configured to evaluate header data of a data frame. The header data includes address data that corresponds to the Fiber Channel Forwarder. Based upon the evaluation, the header data of the data frame may be modified.

In another embodiment, an apparatus is disclosed that includes a plurality of server computers and a distributed virtual bridge. The distributed virtual bridge may include a Fiber Channel Forwarder configured to encapsulate and de-encapsulate data frame data and a plurality of bridge elements coupled to the plurality of server computers. At least one of the plurality of bridge elements is in communication with the Fiber Channel Forwarder and is configured to evaluate header data of a data frame. The header data includes address data that corresponds to the Fiber Channel Forwarder. Based upon the evaluation, the bridge element may modify the header data of the data frame.

In another embodiment, a program product includes program code resident within a memory and configured to be executed by a processor to evaluate header data of a data frame at a bridge element. The header data includes address data that corresponds to a Fiber Channel Forwarder in communication with the bridge element. Based upon the evaluation, the header data of the data frame at the bridge element may be modified. The program product further includes a computer readable medium bearing the program code.

At least one of the embodiments may reduce potential bottlenecks and facilitate efficient processing. Fiber Channel over Ethernet may be supported, and an embodiment of a system may be scalable to include hundreds or more server computers with direct connectivity. For example, select data frames may be forwarded directly between server computers without traversing a Fiber Channel Forwarder.

Features that characterize embodiments of the invention are set forth in the claims annexed hereto and forming a further part hereof. However, for a better understanding of embodiments of the invention, and of the advantages and objectives attained through its use, reference should be made to the Drawings and to the accompanying descriptive matter in which there are described exemplary embodiments of the invention.

V. DETAILED DESCRIPTION

Data frame communication may be improved by accelerating the processing of Fiber Channel over Ethernet (FCoE) transactions within a network switch, or bridge element. The bridge element may streamline processing by manipulating header data without the direct intervention of a Fiber Channel Forwarder. Based upon an evaluation of the data frame, the header data of the data frame may be modified at the bridge element in such a manner that the data frame is not routed through the Fiber Channel Forwarder.

The Fiber Channel Forwarder may perform an initialization protocol, in addition to identifying and programming network switch ports to perform an address manipulation. The address manipulation may include Media Access Control (MAC) address setup and transposing that enable the bridge element to route FCoE data frames between initiator and target server computing nodes without traversing the Fiber Channel Forwarder.

An embodiment of a system may include a multi-rack, interconnected network switch configuration. The network may be segmented into different Local Area Networks (LANs), each representing an isolated Storage Area Network (SAN). Each SAN may include an initiator Information Technology Enclosure (ITE) and a target ITE (e.g., a storage ITE). The ITEs may connect to an Ethernet via a Converged Network Adapter. The Converged Network Adapter (e.g., an SR-IOV adapter) may implement FCoE protocol.

An embodiment of a bridge element may work in combination with the Fiber Channel Forwarder to achieve routing efficiencies in firmware and hardware, which may provide a larger bandwidth and faster processing than software applications. The bridge element may perform snooping operations to identify data frames that conform to preset criteria. A conforming data frame may be manipulated or otherwise modified. In particular embodiments, a bridge element may include a switch or a router device.

FCoE data frames may initially be addressed by initiator and target ITEs to the Fiber Channel Forwarder. That is, the MAC address of the Fiber Channel Forwarder may be specified in the data frames. During protocol processing, the Fiber Channel Forwarder may communicate with the bridge element from which a data frame originated and signal that address manipulation should occur. In response to this communication, a processing port of the bridge element may initiate address manipulation processes (e.g., MAC address transposing). Because the bridge element and the Fiber Channel Forwarder may share domain knowledge, the bridge element may snoop to internally redirect a data frame so that it is not routed through the Fiber Channel Forwarder.

For example, the bridge element may snoop for and intercept a data frame having a destination address that includes the MAC address of the Fiber Channel Forwarder. The MAC address of the Fiber Channel Forwarder may have been learned by a source ITE during a discovery phase, when the Fiber Channel Forwarder established communications with networked devices. During the discovery phase, the target ITEs may respond to broadcast queries from initiator ITEs. The Fiber Channel Forwarder may discover the target ITEs from the query responses.

After the discovery phase, a login phase may be initiated. MAC addresses of the target ITEs may be reassigned by the Fiber Channel Forwarder. The reassigned MAC addresses may be used for subsequent routing and communications between the initiator and the target ITEs. The Fiber Channel Forwarder may populate a table storing MAC addresses assigned to the target and the source ITEs.

The bridge element may manipulate the data frame such that at least a part of the destination address becomes the new source address. At least a part of the original source address may be combined with a destination identifier to become the new destination address of the data frame.

The data frame may appear to the target ITE to have come directly from the Fiber Channel Forwarder. The target ITE may respond to the source ITE using the MAC address of the Fiber Channel Forwarder. The data frame may be intercepted as before by a bridge element. The bridge element may manipulate and direct the data frame back to the source ITE, as specified in an encapsulated FCP portion of the data frame and without traversing the Fiber Channel Forwarder.

Figure 1:
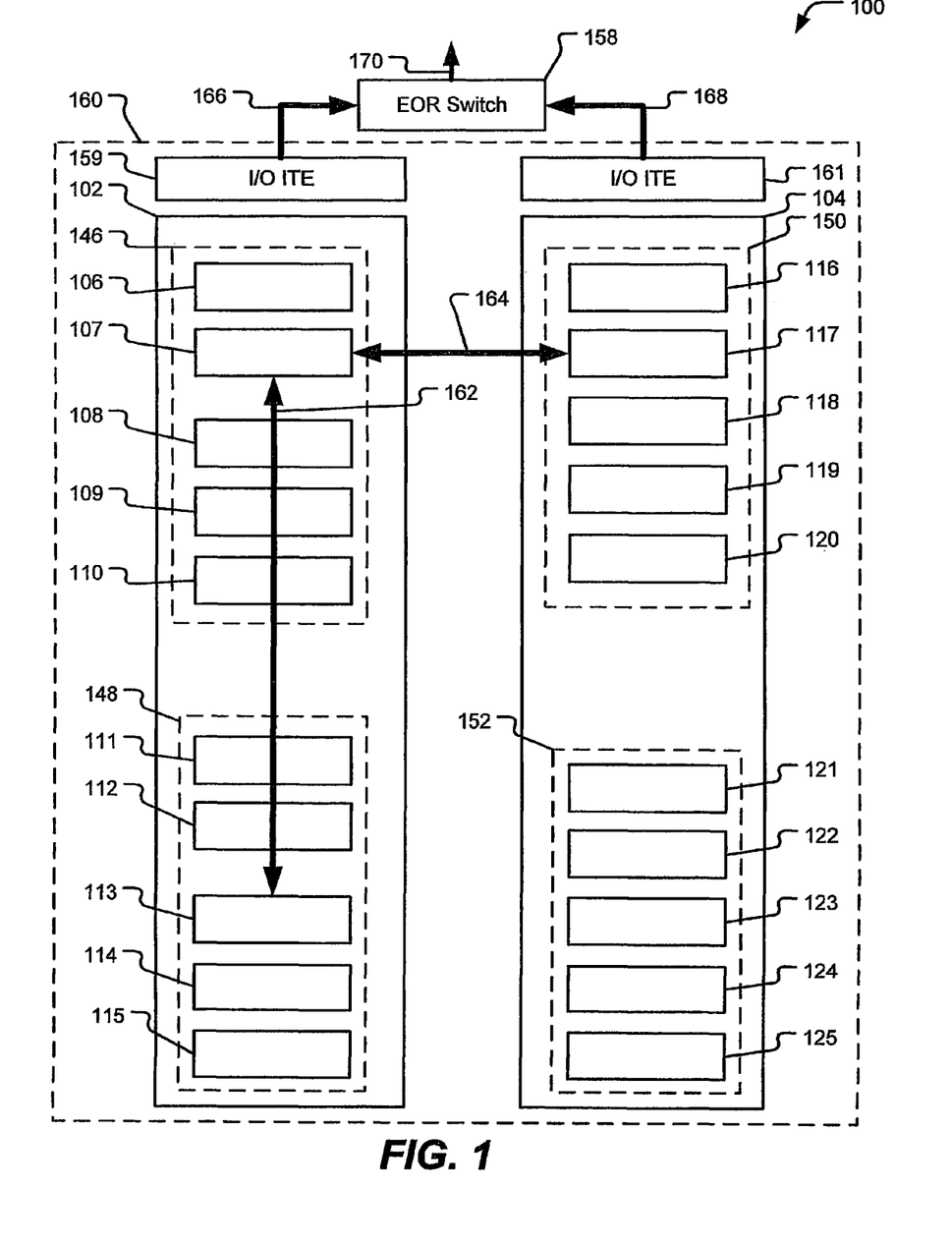
FIG. 1 is a block diagram of an embodiment of a networked computing system configured to allow direct communication between server computers housed within different racks and chassis of blade server computers.

Turning particularly to the drawings, FIG. 1 shows an illustrative embodiment of a highly integrated system 100 configured to forward data frames using a distributed virtual bridge 160. The system 100 may be configured to route FCoE data frames directly between ITEs without traversing the Fiber Channel Forwarder. The distributed virtual bridge 160 may extend across server computers 106-125, chassis 146, 148, 150, 152, and racks 102, 104 to provide data link layer (i.e., Layer 2) switching between bridge elements. The bridge elements may provide a frame-based, Ethernet-like interface. The interface may facilitate lossless, point-to-point, in-order frame delivery between server computers 106-125 of different racks 102, 104 or chassis 146, 148, 150, 152 (i.e., east-west connectivity) with reduced redundancy and latency.

The system 100 further includes an end-of-rack switch 158 and input/output (I/O) server ITEs 159, 161 that enable north-south connectivity. The I/O server ITEs 159, 161 may enable uplink connectivity to the external Ethernet network (or other network) for the server computers 106-125 housed within the racks 102, 104.

An arrow 164 of FIG. 1 represents direct east-west connectivity and the flow of data frames between server computers located in different racks 102, 104 of the system 100 (e.g., without using a top of rack or chassis switch). An arrow 162 represents direct east-west connectivity across different chassis 146, 148 of the rack 102.

The system 100 of FIG. 1 may thus enable direct connectivity between server computers of different racks or chassis. Data frames may further be directly forwarded between initiator and target server computers without traversing the Fiber Channel Forwarder. The direct connectivity may streamline the routing of data frames. The distributed virtual bridge 160 may further reduce contention for resources and increase data frame traffic flow.

Figure 2:
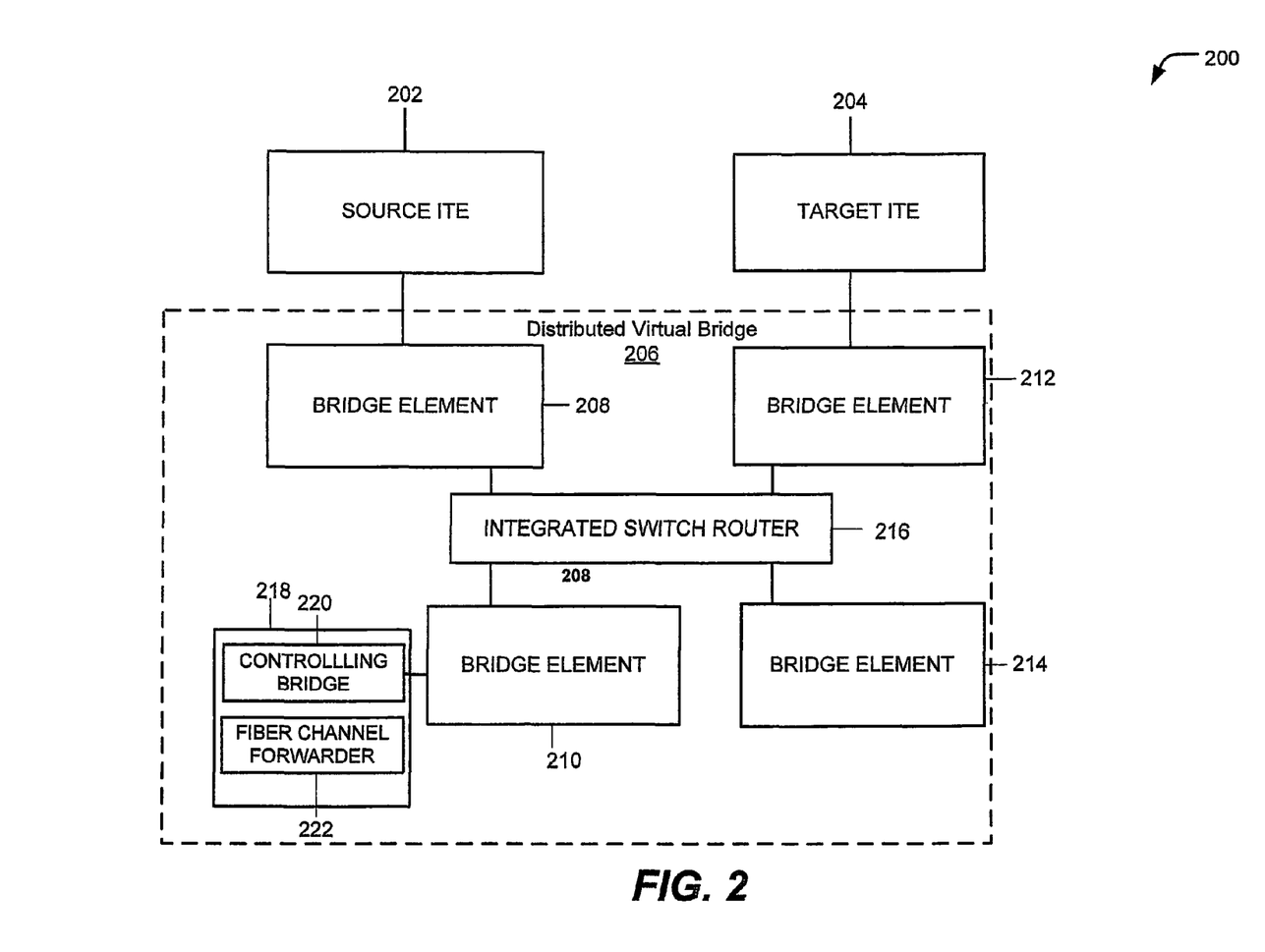
FIG. 2 is a block diagram of a particular embodiment of a system having hardware configured to manipulate address data of select data frames to route the data frames without traversing a Fiber Channel Forwarder.

FIG. 2 shows a particular illustrative embodiment of a highly integrated computer system configured to satisfy the FCoE standard while directly forwarding selected data frames between a source ITE and a target ITE. The selected data frames may not be routed through a Fiber Channel Forwarder.

More particularly, the system 200 may include a source ITE 202 that is coupled to a target ITE 204 via a distributed virtual bridge 206. The distributed virtual bridge 206 may include multiple bridge elements 208, 210, 212, and 214 that are coupled via an integrated switch router 216. The distributed virtual bridge 206 may also include a controlling bridge 220 and a Fiber Channel Forwarder 222 of an I/O blade computing device 218.

The source ITE 202 that and the target ITE 204 may address FCoE data frames to the Fiber Channel Forwarder 222. For example, the destination address of a data frame may be the MAC address of the Fiber Channel Forwarder learned by the source ITE 202 during the login phase. However, certain of the data frames addressed to the Fiber Channel Forwarder 222 may be intercepted and forwarded without being routed to the Fiber Channel Forwarder 222.

The bridge elements 208, 210, 212, and 214 may be programmed by the Fiber Channel Forwarder 222 to perform snooping operations. The snooping operations may include at least one of monitoring, analyzing, and capturing network data frames. Data frames meeting specific criteria may be identified and manipulated.

More specifically, a bridge element 208 may be programmed to recognize address data included within header data of the data frame. For example, the bridge element 208 may identify that a received data frame includes a destination address (e.g., a MAC address) that is associated with the Fiber Channel Forwarder 222. The Fiber Channel Forwarder 222, in addition to other Fiber Channel Forwarders (not shown), may supply the bridge element 208 with address data that was identified during the discovery phase. The provided address data may include the MAC address of the Fiber Channel Forwarders. The address data may be stored at the bridge elements 208, 210, 212, and 214 to assist with the determination of a first criterion (e.g., a recognized MAC address).

The bridge element 208 may further be programmed to identify that a received data frame includes a specified Ether type. The Ether type of the data frame may include a field that indicates a protocol of the payload. For example, the Ether type may indicate that the protocol of the payload is FCoE or Internet Protocol. As such, the bridge element 208 may determine that the data frame includes packet data and is not merely a control packet. When the Ether type is FCoE, a second criterion may be met.

A third criterion that may be determined by the bridge element 208 includes whether the data frame includes a destination identifier. The destination identifier may include a three byte, domain assignment that identifies a device for Fiber Channel routing purposes. The Fiber Channel Forwarder 222 may discover and store the destination identifier during the login phase.

When the bridge element 208 determines that one or more of the criteria are met, a processing port of the bridge element 208 may perform the data frame manipulation (e.g., MAC address transposing). In a particular embodiment, the data frame may be manipulated when all three criteria are satisfied.

The bridge element 208 may manipulate the header data of the data frame such that the destination address becomes the new source address. For example, the new source address may be the MAC address of the Fiber Channel Forwarder 222. The bridge element 208 may concatenate or otherwise combine the destination identifier with a part of the source address to form a new destination address. For example, the destination identifier may be concatenated with a three byte Fiber Channel Map value that has been assigned to a device by the Fiber Channel Forwarder 222 during login. The new destination address may correspond to the MAC address of the target ITE 204.

As a result of the data frame manipulation, the data frame may appear to the target ITE 204 as having been sent by the Fiber Channel Forwarder 222. The target ITE 204 may respond with a data frame addressed to the source MAC address of the Fiber Channel Forwarder 222. A bridge element 212 coupled to the target ITE 204 may intercept and manipulate the data frame such that the data frame is directed by the bridge element 212 to the source ITE 202 specified in the encapsulated Fiber Channel Protocol data frame. The routing of the data frame from the target ITE 204 to the source ITE 202 may be achieved without traversing the Fiber Channel Forwarder 222.

FIG. 2 thus shows a highly integrated system 200 having bridge elements 208, 210, 212, and 214 that may intercept and forward FCoE data frames without traversing the Fiber Channel Forwarder 222. Because the distributed virtual bridge 206 may include domain knowledge of the bridge elements 208, 210, 212, and 214, the controlling bridge 220, and the Fiber Channel Forwarder 222, the bridge element 208 may snoop to internally redirect a data frame away from the Fiber Channel Forwarder 222. Occurrences of processing bottlenecks and resultant latency may consequently be reduced at the Fiber Channel Forwarder 222.

Figure 3:
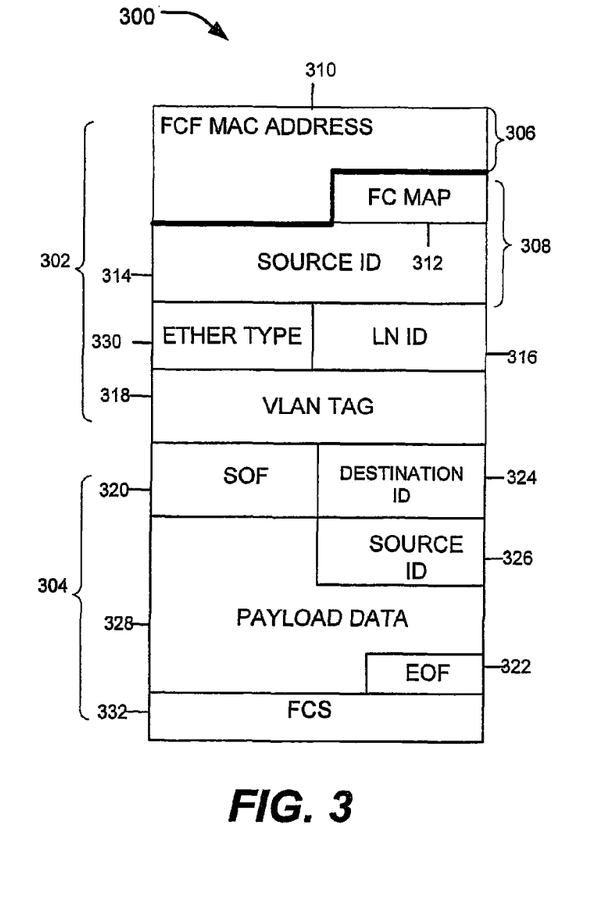
FIG. 3 is a diagram of a data frame configured to be forwarded by the system of FIG. 2.

FIG. 3 is an embodiment of an illustrative data frame 300 that may be manipulated and forwarded by the system 200 of FIG. 2. The data frame 300 may include header data 302 and an encapsulated Fiber Channel frame 304. The header data 302 may be used by the distributed virtual bridge 206 of FIG. 2 to forward the data frame 300.

The header data 302 may include a destination address field 306. The destination address field 306 may include a MAC address 310 of a Fiber Channel Forwarder (FCF), such as the Fiber Channel Forwarder 222 of FIG. 2. The header data 302 may also include a source address field 308. The source address field 308 may include a MAC address that, in part, includes three bytes of a source identifier 314 associated with a source computing node. The source identifier 314 may include a domain-assigned identifier associated with a server computer, a virtual machine, or other computing node from which the payload data 328 was forwarded. The source identifier 314 may be combined with three bytes of Fiber Channel mapping information (FC MAP) 312 assigned by the Fiber Channel Forwarder.

The header data 302 may further include a logical network identifier 316. The logical network identifier 316 may indicate a logical network associated with the data frame 300. A logical network may be included to provide an additional layer of traffic separation. In one example, the logical network identifier 316 may be assigned by an adapter or a bridge element that receives the data frame 300. In another example, the logical network identifier 316 may be included when the data frame 300 is generated. Forwarding of the data frame 300 may occur within the assigned logical network. A Virtual Local Area Network (VLAN) tag 318 may indicate a VLAN to which the data frame 300 is assigned.

An Ether type 330 of the data frame 300 may indicate a protocol of payload data 328. For example, the Ether type 330 may indicate that the protocol of the payload data 328 is FCoE or Internet Protocol.

The encapsulated Fiber Channel frame 304 may be bounded by a start of frame (SOF) 320 and an end of frame (EOF) 322. The encapsulated Fiber Channel Frame 304 may include a copy of the source identifier 326, as well as a destination identifier 324. The destination identifier 324 may include a domain-assigned identifier associated with a server computer, virtual machine, or other computing node intended to receive the payload data 328. A Frame Check Sequence (FCS) 332 may include a checksum added to the data frame 300 for error detection and correction.

Figure 4:
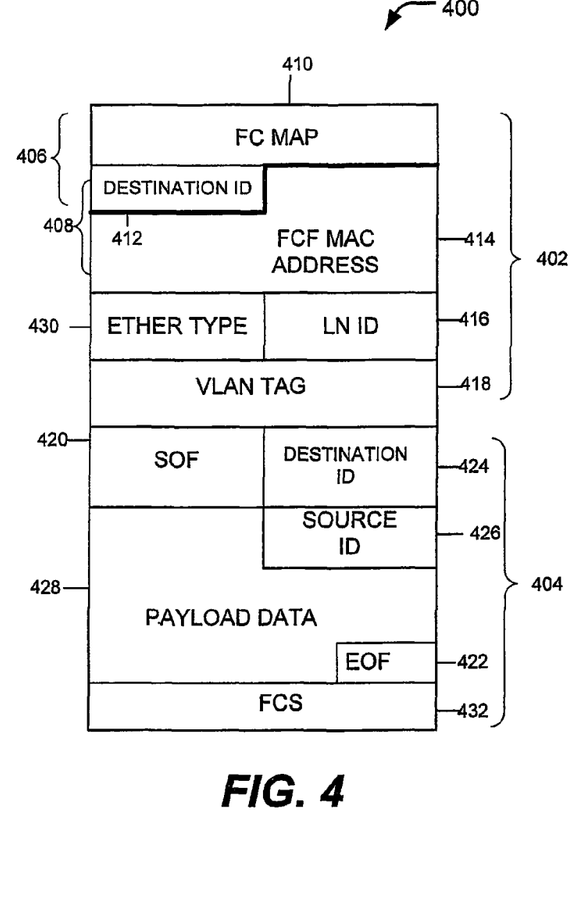
FIG. 4 is a diagram of a data frame having address data that has been manipulated by the system of FIG. 2.

FIG. 4 is an embodiment of an illustrative data frame 400 having address data that has been modified, such as by the system 200 of FIG. 2. For example, the data frame 400 may be the data frame 300 of FIG. 3 after an address manipulation operation by a bridge element.

The data frame 400 may include header data 402 and an encapsulated Fiber Channel frame 404. The header data 402 may include a destination address field 406. The destination address field 406 may include Fiber Channel mapping information (FC MAP) 410 that was previously conveyed in the source address field 408 of the data frame 400. To illustrate, the FC MAP 410 of the destination address field 406 may have been copied from the source address field 308 of FIG. 3. The FC MAP 410 may be combined with a destination identifier 412. For example, the destination identifier 324 of FIG. 3 may be concatenated with the FC MAP 410.

The source address field 408 may include a MAC address 414 of the Fiber Channel Forwarder (FCF). The MAC address 414 may have previously been conveyed in the destination address field 414 of the data frame 400. To illustrate, the MAC address 310 of FIG. 3 may have been copied to the source address field 408 of FIG. 4. This address transposing may give the data frame 400 an appearance of having been sent from the Fiber Channel Forwarder.

The header data 402 may further include a logical network identifier 416 and a VLAN tag 418. An Ether type 430 of the data frame 400 may indicate a protocol of the payload data 428.

The encapsulated Fiber Channel frame 404 may include a start of frame (SOF) 420 and an end of frame (EOF) 422. The encapsulated Fiber Channel Frame 404 may include a copy of the source identifier 426, the destination identifier 424, and a Frame Check Sequence (FCS) 432.

FIGS. 3 and 4 illustrate modifications made to a data frame by hardware and firmware elements. The address data of the data frame may be manipulated in compliance with FCoE standards to appear to have been routed through a Fiber Channel Forwarder. However, the data frame may instead be routed directly to a target computing node without traversing the Fiber Channel Forwarder. This address manipulation may alleviate potential processing bottlenecks that may result in highly integrated computing systems.

Figure 5:
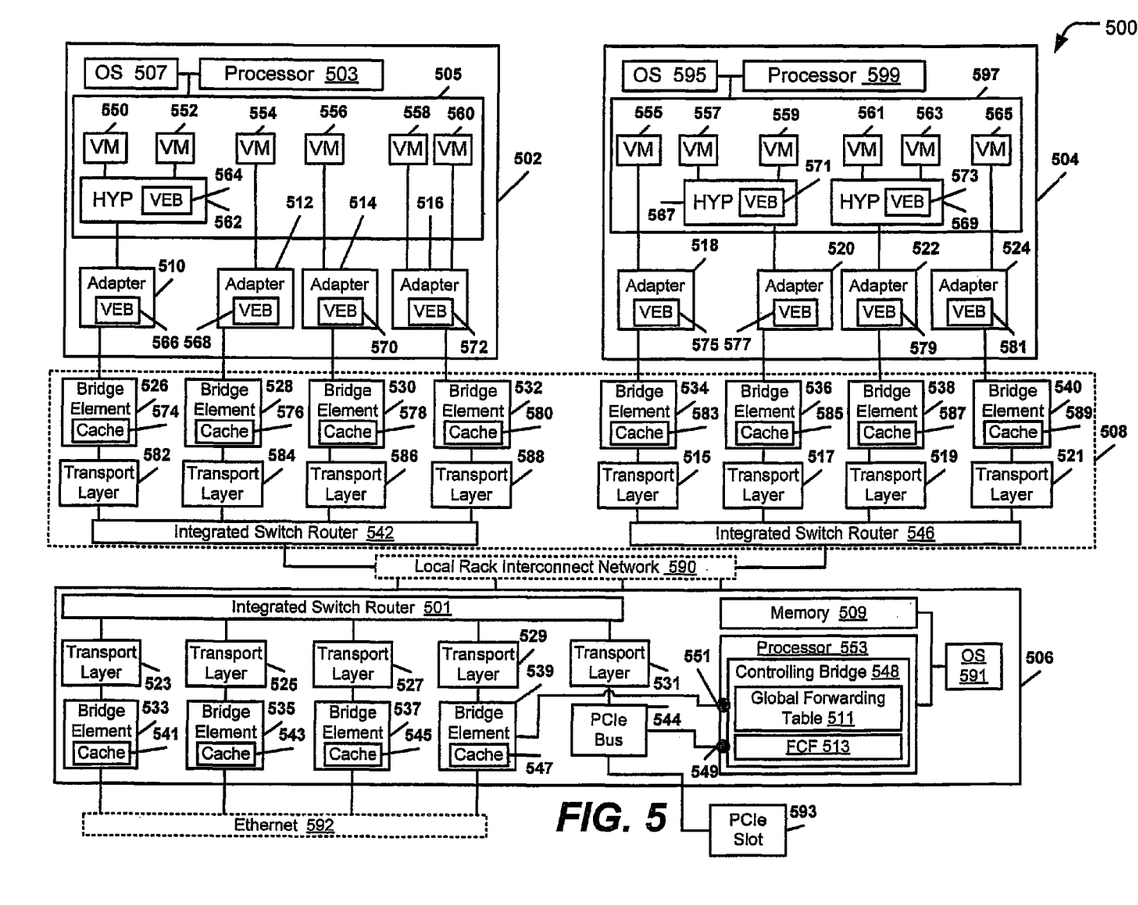
FIG. 5 is a diagram of a particular embodiment of a system configured to forward data frames using a distributed virtual bridge.

Referring to FIG. 5, another particular illustrative embodiment of a highly integrated system 500 configured to forward data frames is depicted. FIG. 5 generally shows a computer system 500 configured to forward data frames using a distributed virtual bridge 508. The distributed virtual bridge 508 may be similar to the distributed virtual bridge 206 of FIG. 2. The system 500 includes a first server computer 502 and a second server computer 504 that are both coupled to an I/O blade device 506 via the distributed virtual bridge 508. The server computers 502, 504 and the I/O blade device 506 may be housed within separate chassis and racks.

The distributed virtual bridge 508 may be coupled to multiple adapters 510, 512, 514, 516, 518, 520, 522, and 524. The adapters 510, 512, 514, 516, 518, 520, 522, and 524 may be located within or may be coupled to the server computers 502, 504. The distributed virtual bridge 508 may use multiple access points, or bridge elements 526, 528, 530, and 532-440 to couple to the server computers 502, 504. For example, a microchip that includes the bridge elements 526, 528, 530, and 532 may be cabled or otherwise coupled to a port of the server computer 502 that includes the adapter 510. As explained herein, the distributed virtual bridge 508 may functionally supplant chassis switches and top of rack switches with a frame-based network fabric that functions in a similar fashion to an Ethernet network.

One or more transport layer modules 582, 584, 586, and 588 coupled to the bridge elements 526, 528, 530, and 532 may provide a frame-based, Ethernet-like interface to one or more integrated switch routers 542. The transport layer module 582 may be configured to deconstruct a transmission of data frames so that packet information may be evenly distributed across links to the local rack interconnect 590. The data frames may not be serialized upon leaving the transport layer module 582. A receiving transport layer module 523 may serialize the data frames to achieve reliable, in-order delivery. If data frame information is determined to be missing by the receiving transport layer module 523, a process may be initiated by the transport layer module 523 to recover the missing data. The translation process may be accomplished in hardware, which may provide a larger bandwidth and faster processing than software applications. The transport layer modules 582, 584, 586, and 588, the integrated switch router 542, and the local rack interconnect network 590 may combine to include an underlying lossless, point-to-point communication network (i.e., an integrated switch router network) between the server computers 502, 504 and the I/O blade device 506.

The bridge elements 526, 528, 530, and 532 may function as data link layer (i.e., Layer 2) bridge forwarders within the distributed virtual bridge 508. The bridge elements 526, 528, 530, and 532 may include learned (e.g., received and stored) cached address data used to forward data frames throughout the distributed virtual bridge 508. The learned address data may correspond to one or both of a destination address and a source address associated with a data frame.

When the bridge element 526 does not include address data pertinent to a source or destination address of a received data frame, the bridge element 526 may query a controlling bridge 548 for the address data. The controlling bridge 548 may include a global forwarding table 511 that includes stored address data. The stored address data may be continuously updated by the bridge elements 526, 528, 530, and 532. For example, a bridge element 526 may send an update message to the controlling bridge 548 in response to learning an updated or new MAC address. A corresponding MAC address in the global forwarding table 511 may be subsequently updated.

Conversely, the address data of the global forwarding table 511 may be used to update the bridge elements 526, 528, 530, and 532. For example, the controlling bridge 548 may respond to a query from the bridge element 526 with requested address data. The bridge element 526 may cache the received address data for future use.

The first server computer 502 may comprise a blade server computer, such as the server computer 202 shown in FIG. 2. The first server computer 502 may include one or more virtual machines (VMs) 550, 552, 554, 556, 558, and 560. A virtual machine may include a software implementation of a computer and may execute programs in a manner similar to a physical machine.

FIG. 5 shows an illustrative hypervisor 562 that is coupled to both the virtual machine 550 and the virtual machine 552. The hypervisor 562 may include platform virtualization software that allows multiple operating systems to run concurrently on the first server computer 502. The hypervisor 562 may include a hypervisor virtual bridge 564 that allows direct communication between the virtual machines 550, 552 without traversal of an external network. In one embodiment, the hypervisor virtual bridge 564 may register address information with the controlling bridge 548.

The server computer 502 may include at least one processor 503 coupled to a memory 505. The processor 503 may represent one or more processors (e.g., microprocessors), and the memory 505 may represent random access memory (RAM) devices comprising the main storage of the server computer 502, as well as supplemental levels of memory, e.g., cache memories, non-volatile or backup memories (e.g., programmable or flash memories), read-only memories, etc. In addition, the memory 505 may be considered to include memory storage physically located in the server computer 502 or on another server computer 504 coupled to the server computer 502 via the distributed virtual bridge 508.

The server computer 502 may operate under the control of an operating system (OS) 507 and may execute or otherwise rely upon various computer software applications, components, programs, objects, modules, and data structures, such as the virtual machines 550, 552, 554, 556, 558, and 560. Moreover, various applications, components, programs, objects, modules, etc. may also execute on one or more processors in another device coupled to the server computer 502 (e.g., in a distributed computing environment, where computing processes may be allocated to multiple server computers).

The first server computer 502 may include adapters 510, 512, 514, and 516, such as converged network adapters. A converged network adapter may include a single root I/O virtualization (SR-My) adapter, such as a Peripheral Component Interconnect Express (PCIe) adapter that supports Converged Enhanced Ethernet (CEE). The adapters 510, 512, 514, and 516 may be used to implement an FCoE protocol. Each adapter 510, 512, 514, and 516 may be coupled to one or more of the virtual machines 550, 552, 554, 556, 558, and 560. The adapters 510, 512, 514, and 516 may facilitate shared access of the virtual machines 550, 552, 554, 556, 558, and 560. While the adapters 510, 512, 514, and 516 are shown in FIG. 5 as being included within the server computer 502, adapters of another embodiment may include physically distinct devices that are separate from the server computers.

Each adapter 510, 512, 514, and 516 may include a converged adapter virtual bridge 566, 568, 570, and 572. The converged adapter virtual bridges 566, 568, 570, and 572 may facilitate sharing of the adapters 510, 512, 514, and 516 by coordinating access by the virtual machines 550, 552, 554, 556, 558, and 560. Each converged adapter virtual bridge 566, 568, 570, and 572 may recognize data flows included within its domain. A recognized domain address may be routed directly, without processing or storage outside of the domain of the particular converged adapter virtual bridge 566, 568, 570, and 572. Each adapter 510, 512, 514, and 516 may include one or more CEE transmit ports that couple to one of the bridge elements 526, 528, 530, and 532. In another embodiment, the bridge elements may be co-located with the adapters, and the coupling between adapters and the bridge elements may not be Ethernet connections.

The bridge elements 526, 528, 530, and 532 may be configured to forward data frames throughout the distributed virtual bridge 508. The bridge elements 526, 528, 530, and 532 may thus function as access points for the distributed virtual bridge 508 by translating between Ethernet and the integrated switch router 542. The bridge elements 526, 528, 530, and 532 may not include buffers and may support CEE at boundaries of the distributed virtual bridge 508. In another embodiment, the bridge elements 526, 528, 530, and 532 may include buffers.

Each bridge element 526, 528, 530, and 532 of the distributed virtual bridge 508 may include a forwarding cache 574, 576, 578, and 580. A forwarding cache 574, 576, 578, and 580 may include a lookup table that comprises address data used to forward data frames that are received by the bridge elements 526, 528, 530, and 532. For example, the bridge element 526 may compare address data associated with a received data frame to the address data stored within the forwarding cache 574.

Illustrative address data may include routing information, such as a routing key that includes bytes of the header data of the data frame. The routing key may include at least one of a virtual local area network (VLAN) tag and a logical network identifier, as well as a MAC address. The MAC address may be generated and assigned by a Fiber Channel Forwarder (FCF) 513, as set by an administrator or computing system. The Fiber Channel Forwarder 513, or FCoE switch, may facilitate connectivity between FCoE initiators and Fiber Channel fabrics. To illustrate, an FCoE data frame sent from the first virtual machine 558 and intended for the second virtual machine 563 may be addressed to the Fiber Channel Forwarder 513 in accordance with the FCoE standard. According to standard routing procedures, the Fiber Channel Forwarder 513 may receive and readdress the FCoE data frame for forwarding to the virtual machine 563.

A VLAN tag may indicate an assigned VLAN, which may be used to segregate traffic and to allow more than one uplink. There may be multiple VLANs on an uplink. Conventionally, each VLAN may use only one uplink port. That is, only one physical, uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth.

A logical network may include a logically specified network portion of the distributed virtual bridge 508. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 574, 576, 578, and 580 of the distributed virtual bridge 508 may have a format similar to the global forwarding table 511 of the controlling bridge 548. The forwarding caches 574, 576, 578, and 580 may have smaller memory capacities than the global forwarding table 511. The forwarding caches 574, 576, 578, and 580 may further be updated with address data learned from data frames that flow through the bridge elements 526, 528, 530, and 532.

The address data may additionally be updated with address data received from the global forwarding table 511. Invalid or changed address data that is updated within one or more of the forwarding caches 574, 576, 578, and 580 of the bridge elements 526, 528, 530, and 532 may be communicated to the global forwarding table 511 of the controlling bridge 548. For example, the bridge element 526 may learn a new MAC address of a newly added device that is configured to receive from or send data to the distributed virtual bridge 508.

The bridge element 526 may verify that a source MAC address included within a received data frame is allowed at a port by checking a list stored within a memory. The bridge element 526 may send a registration message to the controlling bridge 548 to update the global forwarding table 511 with the verified MAC address. The bridge element 526 may further store the MAC address within the forwarding cache 574. In another example, the bridge element 526 may identify a MAC address that is infrequently used. This MAC address may be removed from the forwarding cache 574 to make storage room available for other MAC addresses. The bridge element 526 may send an update message to the controlling bridge 548 to have the MAC address removed from the global forwarding table 511.

Address data stored within the global forwarding table 511 may be communicated to one or more forwarding caches 574, 576, 578, and 580 of the distributed virtual bridge 508. For example, the bridge element 526 may receive a data frame that includes a destination MAC address that is not stored within the forwarding cache 574. To obtain information for forwarding the data frame, the bridge element 526 may send a query to a bridge element 539 configured to access the controlling bridge 548. The bridge element 539 may search the global forwarding table 511 for address data associated with the destination MAC address. If found, the bridge element 539 may forward the MAC address through the distributed virtual bridge 508 to the querying bridge element 526. The bridge element 526 may store the MAC address as address data within the forwarding cache 574. As with the global forwarding table 511, the address data included within the forwarding caches 574, 576, 578, and 580 of the distributed virtual bridge 508 may include both internal address information, as well as addresses that are external to the system 500.

Each of the bridge elements 526, 528, 530, and 532 may be coupled to (e.g., in communication with) one or more transport layer modules 582, 584, 586, and 588. The transport layer modules 582, 584, 586, and 588 may include buffering used for attachment to the integrated switch router 542. The transport layer modules 582, 584, 586, and 588 may further provide a frame-based, Ethernet-like interface to the integrated switch router 542.

The transport layer modules 582, 584, 586, and 588 may each include a shared buffer used to transmit frames across the integrated switch router 542. Additional buffers of the transport layer modules 582, 584, 586, and 588 may be used to receive data frames from the integrated switch router 542. The buffers may be divided among different virtual lanes. Virtual lanes may include logically separated paths for data frame traffic flowing between a bridge element and a transport layer module. For example, there may be four virtual lanes between the bridge element 526 and the transport layer module 582. The transport layer modules 582, 584, 586, and 588 may include logic to recover from faulty microchips and links between a source and a destination. The transport layer modules 582, 584, 586, and 588 may maintain a strict ordering of packets within the same virtual lane regardless of each data frame's path through the local rack interconnect network 590 and the computer system 500.

The integrated switch router 542 may communicate with the transport layer modules 582, 584, 586, and 588 and may facilitate routing and packet delivery to and from the local rack interconnect network 590. The local rack interconnect network 590 may include links to the bridge elements 526, 528, 530, and 532 located within the same chassis and rack, as well as links to the bridge elements 534-440 in different chassis and racks. The local rack interconnect network 590 may include point-to-point connections, or pipes, between bridge elements 526, 528, 530, 532, and 533-440 of the distributed virtual bridge 508 with no loss and with in-order frame delivery.

The second server computer 504 may include a server computer similar to the first server computer 502 and may be similar to the server computer 216 of FIG. 2. As such, the second server computer 504 may be located within a different chassis and rack than the first server computer 502. Similar to the first server computer 502, the second server computer 504 may include a processor 599 coupled to a memory 597 and an operating system 595. The second server computer 504 may further include virtual machines 555, 557, 559, 561, 563, and 565.

A hypervisor 567 may be coupled to the virtual machines 557, 559. The hypervisor 567 may include a hypervisor virtual bridge 571 that allows direct communication between the virtual machines 557, 559. A hypervisor virtual bridge 573 of a hypervisor 569 coupled to the virtual machines 561, 563 may facilitate direct communication between the virtual machines 561, 563. For example, the hypervisor virtual bridges 571, 573 may register address data with the controlling bridge 548.

The second server computer 504 may also include one or more adapters 518, 520, 522, and 524, such as converged CEE network adapters. Each adapter 518, 520, 522, and 524 may be coupled to one or more of the virtual machines 555, 557, 559, 561, 563, and 565. The adapters 518, 520, 522, and 524 may each include a converged adapter virtual bridge 575, 577, 579, and 581. The converged adapter virtual bridges 575, 577, 579, and 581 may facilitate sharing of the adapters 518, 520, 522, and 524 by coordinating virtual machine access. The adapters 518, 520, 522, and 524 may each couple to one or more of the bridge elements 534, 536, 538, and 540 of the distributed virtual bridge 508. Each adapter 518, 520, 522, and 524 may include one or more CEE transmit ports that couple to one of the bridge elements 534, 536, 538, or 540.

Each bridge element 534, 536, 538, and 540 may include a forwarding cache 583, 585, 587, and 589 that includes address data used to forward data frames that are received by the bridge elements 534, 536, 538, and 540. The bridge elements 534, 536, 538, and 540 may each be connected to one or more transport layer modules 515, 517, 519, and 521. The transport layer modules 515, 517, 519, and 521 may include buffering used for the attachment to the integrated switch router 546. The transport layer modules 515, 517, 519, and 521 may further provide a frame-based, Ethernet-like interface to the integrated switch router 546 and may maintain packet ordering. A portion of the distributed virtual bridge 508 shown in FIG. 5 above the local rack interconnect network 590 as being associated with the first and second server computers 502, 504 may be referred to as a north portion. The bridge elements 526, 528, 530, 532, 534, 536, 538, and 540 may be coupled to the adapters 510, 512, 514, 516, 518, 520, 522, and 524.

The I/O blade device 506 may be the I/O server computer 159 of FIG. 1. As such, the I/O blade device 506 may allow uplink connectivity to the external Ethernet network 592 via an integrated switch router 501 that is coupled to the transport layer modules 523, 525, 527, 529, and 531.

The transport layer modules 523, 525, 527, 529, and 531 may each couple to a bridge element 533, 535, 537, and 539. The bridge elements 533, 535, 537, and 539 may each include a forwarding cache 541, 543, 545, and 547. The I/O blade device 506 may be categorized as being included within a south portion of the distributed virtual bridge 508 because the bridge elements 533, 535, 537, and 539 of the I/O blade device 506 may be coupled to an uplink to the Ethernet 592.

The I/O blade device 506 may include a memory 509, an operating system 591, and a processor 553 that includes the controlling bridge 548. The bridge element 539 may be coupled to the processor 553 via an Ethernet link connection 551. The transport layer module 531 may be coupled to a PCIe bus 544 that is coupled via a PCIe link connection 549 to the processor 553 and the controlling bridge 548. The PCIe bus 544 may also be coupled to a PCIe slot 593.

The controlling bridge 548 may communicate with the bridge elements 526, 528, 530, and 532-440 and other controlling bridges (not shown) of the computer system 500. The controlling bridge 548 may include firmware executing on the processor 553 that manages the bridge elements 526, 528, 530, and 532-440. For example, the controlling bridge 548 may be configured to divide a workload between the bridge elements 526, 528, 530, and 532-440, as well as perform synchronization procedures and failover operations.

The controlling bridge 548 may include the Fiber Channel Forwarder 513. FCoE may offer the capability to transport fiber channel payloads on top of an Ethernet network. The Fiber Channel Forwarder 513 may include firmware that encapsulates and de-encapsulates Fiber Channel data frames (e.g., FCoE formatted data frames). FCoE offers the capability to transport fiber channel payloads on top of an Ethernet network. In one embodiment, the Fiber Channel Forwarder 513 may translate between Ethernet and Fiber Channel protocols.

The controlling bridge 548 may additionally include the global forwarding table 511. The global forwarding table 511 may include address data (e.g., MAC addresses) that is registered and maintained through communication and cooperation with the bridge elements 526, 528, 530, and 532-440, and in some cases, the hypervisors 562, 567, and 569.

In one example, the global forwarding table 511 may maintain MAC addresses that have been learned by a bridge element 526. The bridge element 526 may register the address with the controlling bridge 548. The controlling bridge 548 may update the global forwarding table 511 by adding the address to the global forwarding table 511. Similarly, the bridge element 526 may cause the controlling bridge 548 to update the global forwarding table 511 by sending an update message to the controlling bridge 548. The update message may cause the controlling bridge 548 to delete a MAC address that has been aged out by the bridge element 526. A MAC address may further be deleted when the bridge element 526 has detected that the address data is no longer valid.

In another example, the hypervisor virtual bridge 564 may register MAC addresses or other address data with the controlling bridge 548. The global forwarding table 511 may include address data associated with addresses that are included within the system 500, as well as addresses that are external to the system 500.

FIG. 5 thus shows an embodiment of a system 500 that includes a distributed virtual bridge configured for lossless, point-to-point, in-order data frame delivery. The system 500 may support Fiber channel over Ethernet (FCoE) and may be scalable to include hundreds or more server computers. A data frame may be forwarded directly between computing nodes 552, 559 without direct intervention by a Fiber Channel Forwarder to reduce routing contention and processing complexity.

Figure 6:
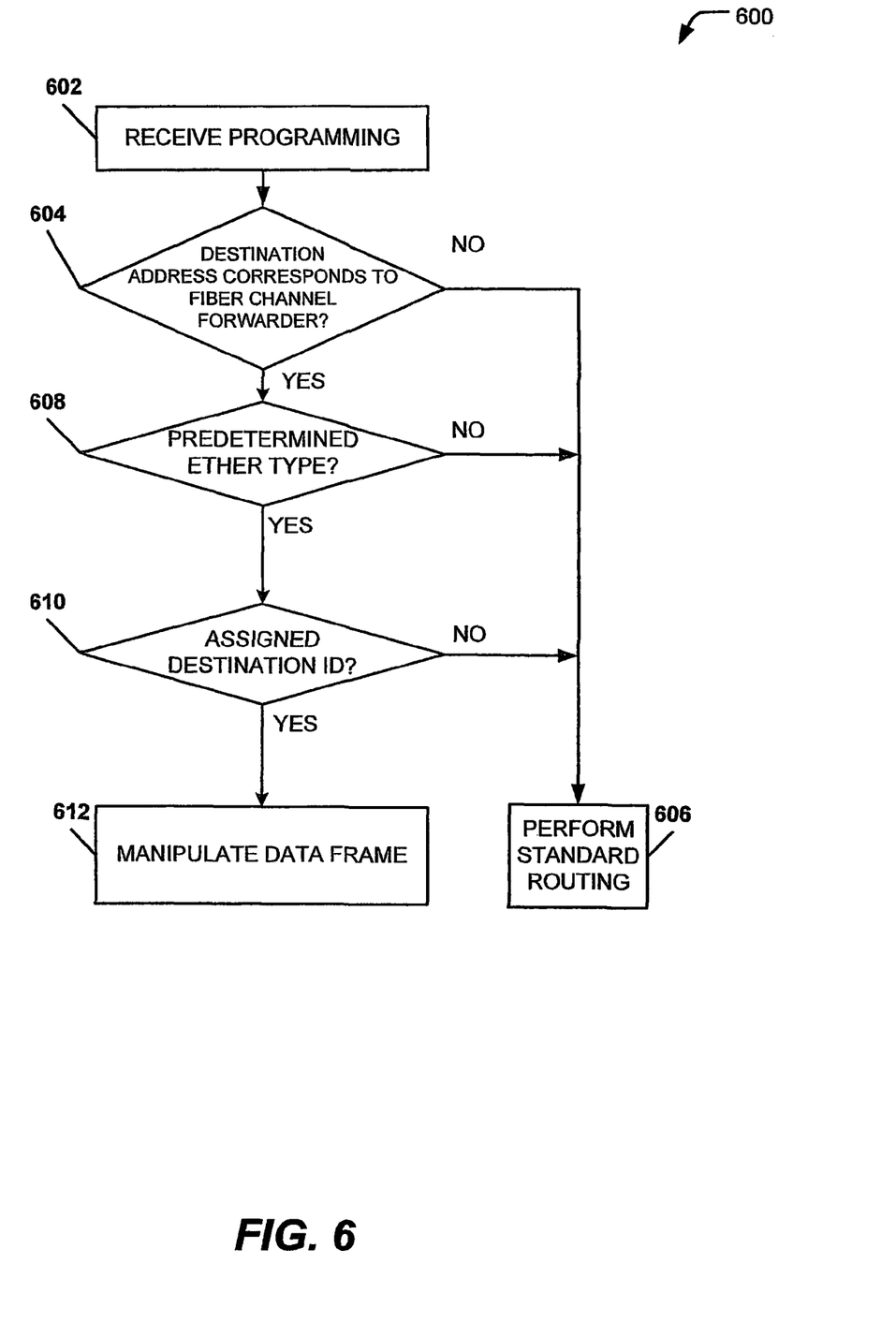
FIG. 6 is a flow diagram of a particular embodiment of a method to select data frames for address manipulation at a bridge element.

FIG. 6 is a flow diagram of an embodiment of a method of forwarding a data frame and is generally designated 600. In a particular embodiment, the method 600 is performed by the bridge element 208 of the system 200 of FIG. 2.

At 602, a bridge element may be programmed perform a data frame address manipulation operation. For example, the Fiber Channel Forwarder 222 of FIG. 2 may identify and program a port of the bridge element 208 to perform MAC address setup and transposing. The Fiber Channel Forwarder 222 may additionally provide a MAC address that corresponds to the Fiber Channel Forwarder 222. Other Fiber Channel Forwarders may similarly provide their respective MAC addresses to the bridge element 208 for storage. In other embodiments, the programming may be accomplished by a controlling bridge or other entity, such as the controlling bridge 548 and processor 553 of FIG. 5.

At 604, the bridge element may determine whether a destination address of a received data frame corresponds to the address of the Fiber Channel Forwarder. For instance, the bridge element 208 of FIG. 2 may determine whether the destination address of a data frame is the same as the Fiber Channel Forwarder 222. The bridge element 108 may retrieve the Fiber Channel Forwarder address(es) from a memory to make the determination.

When the destination address of the received data frame does not correspond to the address of the Fiber Channel Forwarder, the data frame may be routed in a standard fashion, at 606. For example, a data frame may not be manipulated by the bridge element 208 of FIG. 2 and may be routed to the Fiber Channel Forwarder 222.

The bridge element may determine whether an Ether type of the data frame includes a specified protocol, at 608. For instance, the bridge element 208 of FIG. 2 may determine if the Ether type of a data frame is FCoE. The data frame may be routed in a standard manner (e.g., through the Fiber Channel Forwarder) when the Ether type is not the predetermined protocol, at 606.

When the Ether type is the predetermined protocol, the bridge element may determine whether a destination identifier has been included in the data frame. For example, the bridge element 208 of FIG. 2 may determine that the data frame includes an assigned destination identifier, at 610. The data frame may be routed in a standard manner when the Ether type is not the predetermined protocol, at 606.

When the destination identifier has alternatively been assigned and included within the data frame, the bridge element may manipulate the address data of the data frame, 612. For example, the bridge element 208 of FIG. 2 may perform an address transposing operation on a data frame.

FIG. 6 thus shows a method 600 that may enable FCoE frames to be routed directly between initiator and target server computers without routing to a Fiber Channel Forwarder. The direct routing may reduce traffic bottlenecks while providing lossless, point-to-point, in-order frame delivery of a data frame. The method may further enable a system to be scalable to include hundreds or more server computers with direct connectivity.

Figure 7:
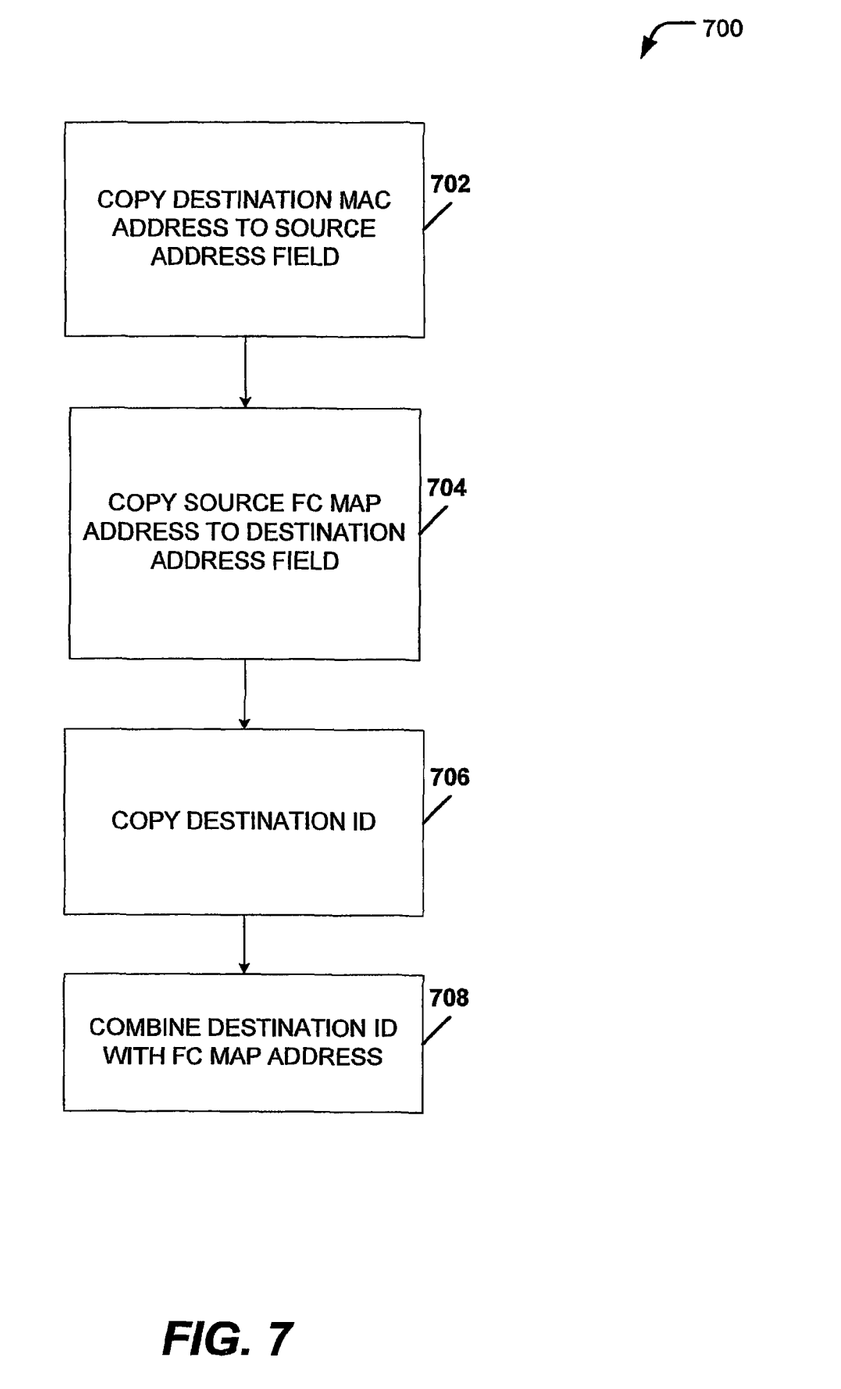
FIG. 7 is a flow diagram of a particular embodiment of a method to manipulate address data of data frames at a bridge element.

FIG. 7 is a flow diagram of an embodiment of a method of manipulating address data of a data frame and is generally designated 700. In a particular embodiment, the method 700 is performed by the system 200 of FIG. 2. More particularly, the method 600 may be performed by the bridge element 208 of the system 200 and may be illustrated with reference to FIGS. 3 and 4.

At 702, a destination MAC address may be copied to a source address field of a data frame. For example, the Fiber Channel Forwarder MAC address 310 of the destination address field 306 of FIG. 3 may be copied to the source address field 308. FIG. 4 shows the data frame 400 with the Fiber Channel Forwarder MAC address 414 having been copied into the source address field 408.

A source FC MAP address may be copied to a destination address field of the data frame, at 704. For instance, the FC MAP address 312 of the data frame 300 of FIG. 3 may be copied to the destination address field 306. FIG. 4 shows the data frame 400 with the FC MAP address 410 having been copied into the destination address field 406.

At 706, a destination identifier may be copied from the data frame. For example, the destination identifier 324 of FIG. 3 may be copied by a bridge element that received the data frame.

The destination identifier may be combined with the FC MAP address, at 708. For instance, the destination identifier 324 of the data frame 300 of FIG. 3 may be copied to the destination address field 306. FIG. 4 shows the data frame 400 with a destination identifier 412 having been copied into the destination field 406 and combined with the FC MAP address 410.

FIG. 7 thus shows an embodiment of a method of manipulating address data in such a manner that the data frame may be forwarded between a source and target server computer without passing through a Fiber Channel Forwarder. The address transposing of the method 700 may be achieved in hardware (e.g., a bridge element) to improve processing speed and routing efficiency.

Particular embodiments described herein may take the form of an entirely hardware embodiment, an entirely software embodiment or an embodiment containing both hardware and software elements. In a particular embodiment, the disclosed methods are implemented in software that is embedded in processor readable medium and executed by a processor, which includes but is not limited to firmware, resident software, microcode, etc.

Further, embodiments of the present disclosure, such as the one or more embodiments may take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method of forwarding a data frame, the method comprising:

using a Fiber Channel Forwarder to program a bridge element of a plurality of bridge elements of a distributed virtual bridge to recognize address data corresponding to the Fiber Channel Forwarder, wherein the bridge element is configured to encapsulate and de-encapsulate data frame data, wherein the bridge element is coupled to an integrated switch router and a local rack interconnect network, wherein the integrated switch router facilitates routing and packet delivery to and from the local rack interconnect network, and wherein the local rack interconnect network includes point-to-point connections between the plurality of bridge elements;

evaluating header data of a Fiber Channel over Ethernet data frame at the bridge element to determine whether the header data is addressed to the Fiber Channel Forwarder, wherein evaluating the header data of the Fiber Channel over Ethernet data frame includes evaluating whether the header data of the Fiber Channel over Ethernet data frame includes the address data corresponding to the Fiber Channel Forwarder from the programming by the Fiber Channel Forwarder;

in response to determining that the header data is addressed to the Fiber Channel Forwarder, modifying the header data of the Fiber Channel over Ethernet data frame at the bridge element to give an appearance that the Fiber Channel Forwarder is sending the Fiber Channel over Ethernet data frame to a target computing node; and forwarding the Fiber Channel over Ethernet data frame from the bridge element to the target computing node without forwarding the Fiber Channel over Ethernet data frame to the Fiber Channel Forwarder.

2. The method of claim 1, further comprising verifying that a destination identifier of the header data is included within the address data.

3. The method of claim 1, wherein modifying the header data further comprises reassigning at least a part of a first address of a destination field of the header data of the Fiber Channel over Ethernet data frame to a source address field of the header data of the Fiber Channel over Ethernet data frame.

4. The method of claim 1, wherein modifying the header data further comprises reassigning at least a part of a first address of a source field of the header data of the Fiber Channel over Ethernet data frame to a destination address field of the header data of the Fiber Channel over Ethernet data frame.

5. The method of claim 4, further comprising combining the at least part of the first address with a destination identifier.

6. The method of claim 1, further comprising receiving the address data from the Fiber Channel Forwarder at the bridge element.

7. The method of claim 1, further comprising receiving the Fiber Channel over Ethernet data frame at the bridge element.

8. The method of claim 1, further comprising evaluating header data of another Fiber Channel over Ethernet data frame, and based upon the evaluation, forwarding the other Fiber Channel over Ethernet data frame to the Fiber Channel Forwarder.

9. An apparatus comprising:

a Fiber Channel Forwarder configured to program a bridge element of a plurality of bridge elements of a distributed virtual bridge to recognize address data corresponding to the Fiber Channel Forwarder, wherein the bridge element is configured to encapsulate and de-encapsulate data frame data, wherein the bridge element is coupled to an integrated switch router and a local rack interconnect network, wherein the integrated switch router facilitates routing and packet delivery to and from the local rack interconnect network, and wherein the local rack interconnect network includes point-to-point connections between the plurality of bridge elements; and the bridge element configured to evaluate header data of a Fiber Channel over Ethernet data frame at the bridge element to determine whether the header data is addressed to the Fiber Channel Forwarder, to evaluate the header data of the Fiber Channel over Ethernet data frame by evaluating whether the header data of the Fiber Channel over Ethernet data frame includes the address data corresponding to the Fiber Channel Forwarder from the programming by the Fiber Channel Forwarder, in response to determining that the header data is addressed to the Fiber Channel Forwarder, to modify the header data of the Fiber Channel over Ethernet data frame at the bridge element to give an appearance that the Fiber Channel Forwarder is sending the Fiber Channel over Ethernet data frame to a target computing node, and to forward the Fiber Channel over Ethernet data frame from the bridge element to the target computing node without forwarding the Fiber Channel over Ethernet data frame to the Fiber Channel Forwarder.

10. The apparatus of claim 9, wherein the bridge element is further configured to determine whether a destination identifier of the header data is included within the address data.

11. The apparatus of claim 9, wherein the modifying of the header data includes reassigning at least a part of a first address of a destination field of the header data of the Fiber Channel over Ethernet data frame to a source address field of the header data of the Fiber Channel over Ethernet data frame.

12. The apparatus of claim 9, wherein the modifying of the header data includes reassigning at least a part of a first address of a source field of the header data of the Fiber Channel over Ethernet data frame to a destination address field of the header data of the Fiber Channel over Ethernet data frame.

13. The apparatus of claim 12, wherein the modifying of the header data further includes combining the at least part of the first address with a destination identifier.

14. An apparatus comprising:
a plurality of server computers including a plurality of adapters located within the plurality of server computers or coupled to the plurality of server computers; and
a distributed virtual bridge comprising:
a Fiber Channel Forwarder configured to program at least one bridge element of a plurality of bridge elements to recognize address data corresponding to the Fiber Channel Forwarder, wherein the bridge element is configured to encapsulate and de-encapsulate data frame data;
the plurality of bridge elements coupled to the plurality of server computers via the plurality of adapters and coupled to an integrated switch router and a local rack interconnect network, wherein the integrated switch router facilitates routing and packet delivery to and from the local rack interconnect network, and wherein the local rack interconnect network includes point-to-point connections between the plurality of bridge elements; and
the at least one bridge element of the plurality of bridge elements configured to evaluate header data of a Fiber Channel over Ethernet data frame at the at least one bridge element to determine whether the header data is addressed to the Fiber Channel Forwarder, to evaluate the header data of the Fiber Channel over Ethernet data frame by evaluating whether the header data of the Fiber Channel over Ethernet data frame includes the address data corresponding to the Fiber Channel Forwarder from the programming by the Fiber Channel Forwarder, in response to determining that the header data is addressed to the Fiber Channel Forwarder, to modify the header data of the Fiber Channel over Ethernet data frame at the at least one bridge element to give an appearance that the Fiber Channel Forwarder is sending the Fiber Channel over Ethernet data frame to a target computing node, and to forward the Fiber Channel over Ethernet data frame from the at least one bridge element to the target computing node without forwarding the Fiber Channel over Ethernet data frame to the Fiber Channel Forwarder.

15. A program product, comprising:
program code configured to be executed by a processor to:
evaluate header data of a Fiber Channel over Ethernet data frame at a bridge element of a plurality of bridge elements of a distributed virtual bridge to determine whether the header data is addressed to a Fiber Channel Forwarder, including to evaluate the header data of the Fiber Channel over Ethernet data frame by evaluating whether the header data of the Fiber Channel over Ethernet data frame includes address data corresponding to the Fiber Channel Forwarder from the programming by the Fiber Channel Forwarder, wherein the Fiber Channel Forwarder is configured to program the bridge element to recognize the address data corresponding to the Fiber Channel Forwarder, wherein the bridge element is configured to encapsulate and de-encapsulate data frame data, wherein the bridge element is coupled to an integrated switch router and a local rack interconnect network, wherein the integrated switch router facilitates routing and packet delivery to and from the local rack interconnect network, and wherein the local rack interconnect network includes point-to-point connections between the plurality of bridge elements,
in response to determining that the header data is addressed to the Fiber Channel Forwarder, modify the header data of the Fiber Channel over Ethernet data frame at the bridge element to give an appearance that the Fiber Channel Forwarder is sending the Fiber Channel over Ethernet data frame to a target computing node, and
forward the Fiber Channel over Ethernet data frame from the bridge element to the target computing node without forwarding the Fiber Channel over Ethernet data frame to the Fiber Channel Forwarder; and
a computer readable non-transitory medium bearing the program code.

16. The apparatus of claim 14, wherein modifying the header data includes reassigning a Media Access Control (MAC) address of the Fiber Channel Forwarder of a destination field of the header data of the Fiber Channel over Ethernet data frame to a source field of the header data of the Fiber Channel over Ethernet data frame.

17. The program product of claim 15, wherein modifying the header data includes reassigning a Media Access Control (MAC) address of the Fiber Channel Forwarder of a destination field of the header data of the Fiber Channel over Ethernet data frame to a source field of the header data of the Fiber Channel over Ethernet data frame.

18. The method of claim 3, wherein the first address of the destination field of the header data is a Media Access Control (MAC) address of the Fiber Channel Forwarder.

19. The method of claim 4, wherein the first address of the source field of the header data is Fiber Channel mapping information.

20. The method of claim 5, wherein the first address is Fiber Channel mapping information.

21. The apparatus of claim 11, wherein the first address of the destination field of the header data is a Media Access Control (MAC) address of the Fiber Channel Forwarder.

22. The apparatus of claim 12, wherein the first address of the source field of the header data is Fiber Channel mapping information.

23. The apparatus of claim 13, wherein the first address is Fiber Channel mapping information.

24. The apparatus of claim 14, wherein modifying the header data includes:
reassigning Fiber Channel mapping information of a source field of the header data of the Fiber Channel over Ethernet data frame to a destination address field of the header data of the Fiber Channel over Ethernet data frame, and
combining the Fiber Channel mapping information with a destination identifier.

25. The apparatus of claim 15, wherein modifying the header data includes:

reassigning Fiber Channel mapping information of a source field of the header data of the Fiber Channel over Ethernet data frame to a destination address field of the header data of the Fiber Channel over Ethernet data frame, and combining the Fiber Channel mapping information with a destination identifier.

\* \* \* \* \*